(12) United States Patent  (10) Patent No.: US 11,752,488 B2
Zhang et al.  (45) Date of Patent: Sep. 12, 2023

(54) ADSORBENT COMPRISING CARBOXYLIC ACID DIMER AND PREPARATION METHOD THEREOF

(71) Applicant: Nanjing University, Nanjing (CN)

(72) Inventors: Weiming Zhang, Nanjing (CN); Chenghan Ji, Nanjing (CN); Bingcai Pan, Nanjing (CN); Ming Hua, Nanjing (CN); Lu Lyu, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 155 days.

(21) Appl. No.: 17/326,378

(22) Filed: May 21, 2021

(65) Prior Publication Data

US 2022/0203327 A1 Jun. 30, 2022

(30) Foreign Application Priority Data

Dec. 29, 2020 (CN) .......................... 202011587940.7

(51) Int. Cl.
*B01J 20/24* (2006.01)
*B01J 20/10* (2006.01)
*B01J 20/18* (2006.01)
*B01J 20/20* (2006.01)
*B01J 20/22* (2006.01)
(Continued)

(52) U.S. Cl.
CPC .............. *B01J 20/24* (2013.01); *B01J 20/103* (2013.01); *B01J 20/18* (2013.01); *B01J 20/20* (2013.01); *B01J 20/226* (2013.01); *B01J 20/2808* (2013.01); *B01J 20/28059* (2013.01); *B01J 20/28061* (2013.01); *B01J 20/28066* (2013.01); *B01J 20/28083* (2013.01); *B01J 20/3085* (2013.01); *B01J 20/3204* (2013.01); *B01J 20/3208* (2013.01); *C02F 1/285* (2013.01); *C02F 1/288* (2013.01); *C02F 2101/203* (2013.01); *C02F 2101/206* (2013.01); *C02F 2101/22* (2013.01)

(58) Field of Classification Search
None
See application file for complete search history.

(56) References Cited

PUBLICATIONS

Jiang, Y., et al., Rational design of thermo-responsive adsorbents: demand-oriented active sites for the adsorption of dyes, Chem. Commun., 2017, 53, 9538, DOI: 10.1039/c7cc05843h (Year: 2017).*

* cited by examiner

*Primary Examiner* — Chester T Barry
(74) *Attorney, Agent, or Firm* — MATTHIAS SCHOLL P.C.; Matthias Scholl

(57) ABSTRACT

An adsorbent includes a porous substrate and a carboxylic acid dimer loaded onto the porous substrate. The carboxylic acid dimer is loaded on the surface or in the plurality of holes of the porous substrate. The average pore size of the porous substrate is not smaller than 2 nm. The carboxylic acid dimer is loaded onto the porous substrate by at least one of the following manners: a) the carboxylic acid dimer is loaded onto the porous substrate through a Si—OH bond; b) the carboxylic acid dimer is loaded onto the porous substrate through the exchange between a carboxyl group and chlorine; c) the carboxylic acid dimer is loaded onto the porous substrate through the exchange between a carboxyl group and a hydroxyl group; and d) the carboxylic acid dimer is loaded onto the porous substrate through the coordination of a carboxyl group and aluminum or silicon.

12 Claims, 11 Drawing Sheets

(51) Int. Cl.
*B01J 20/28* (2006.01)
*B01J 20/30* (2006.01)
*B01J 20/32* (2006.01)
*C02F 1/28* (2023.01)
*C02F 101/20* (2006.01)
*C02F 101/22* (2006.01)

ADSORBENT COMPRISING CARBOXYLIC ACID DIMER AND PREPARATION METHOD THEREOF

CROSS-REFERENCE TO RELATED APPLICATIONS

Pursuant to 35 U.S.C. § 119 and the Paris Convention Treaty, this application claims foreign priority to Chinese Patent Application No. 202011587940.7 filed Dec. 29, 2020, the contents of which, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, Mass. 02142.

BACKGROUND

The disclosure relates to the field of wastewater treatment with nanocomposite functional materials, and more particularly, to an adsorbent comprising a carboxylic acid dimer, and a preparation method thereof.

Chemical precipitation is widely used in the removal of heavy metals in a variety of industrial wastewater, such as printing and dyeing wastewater, electroplating wastewater, mining wastewater and so on. However, there are heavy metal residues in the wastewater treated by chemical precipitation. Thus, it is necessary to reduce the concentration of heavy metals. Adsorption is one of the practical methods to remove trace heavy metals (<1.0 mg/L). At present, a variety of adsorbents, such as metal-organic frameworks (MOFs), resins, zeolites and activated carbon, are widely used in the deep removal of trace heavy metals.

In practical use, the regeneration performance of the adsorbents is a critical factor to evaluate the feasibility and usage cost of the process for removal of trace heavy metals. Conventionally, thermoresponsive MOFs including dicarboxylic acid polymers are used as adsorbents for removal of trace heavy metals. However, MOFs are expensive, and sensitive to temperature. The ideal water temperature for desorption of the MOFs including dicarboxylic acid polymers is 80° C. or above. And after cycle use for about 10 times, the desorption capacity and adsorption capacity of the adsorbents decrease quickly.

SUMMARY

Conventionally, after several times of cycle use for treating wastewater comprising heavy metal ions, the desorption capacity and adsorption capacity of the existing MOF (metal-organic framework) materials comprising the carboxylic acid dimer tend to decrease, and the structure thereof tends to be unstable. Thus, one object of the disclosure is to provide an adsorbent comprising a porous substrate; the porous substrate comprises silica materials, porous resin materials, charcoal materials, chitosan materials, activated carbon materials, or zeolite materials. The desorption of the adsorbent can occur at low temperatures, which ensures the desorption capacity, adsorption capacity and structural stability thereof after several times of cycle use. Another object of the disclosure is to provide a method for preparing the adsorbent.

Specifically, the disclosure provides an adsorbent comprising a porous substrate and a carboxylic acid dimer loaded onto the porous substrate. The carboxylic acid dimer is loaded on the surface or in the plurality of holes of the porous substrate.

The average pore size of the porous substrate is not smaller than 2 nm;

The minimum pore size of the porous substrate is not smaller than 1.5 nm;

the carboxylic acid dimer is loaded onto the porous substrate by at least one of the following manners:

a) the carboxylic acid dimer is loaded onto the porous substrate through a Si—OH bond;

b) the carboxylic acid dimer is loaded onto the porous substrate through the exchange between a carboxyl group and chlorine;

c) the carboxylic acid dimer is loaded onto the porous substrate through the exchange between a carboxyl group and a hydroxyl group; and d) the carboxylic acid dimer is loaded onto the porous substrate through the coordination of a carboxyl group and aluminum or silicon.

In a class of this embodiment, the porous substrate comprises at least one adsorbent material selected from the group consisting of silica materials, porous resin materials, charcoal materials, chitosan materials, activated carbon materials, and zeolite materials;

when the porous substrate comprises silica materials, the carboxylic acid dimer is loaded onto the porous substrate through the Si—OH bond;

when the porous substrate comprises porous resin materials, the carboxylic acid dimer is loaded onto the porous substrate through the exchange between the carboxyl group and chlorine;

when the porous substrate comprises charcoal materials, the carboxylic acid dimer is loaded onto the porous substrate through the exchange between the carboxyl group and the hydroxyl group;

when the porous substrate comprises chitosan materials, the carboxylic acid dimer is loaded onto the porous substrate through the exchange between the carboxyl group and the hydroxyl group;

when the porous substrate comprises activated carbon materials, the carboxylic acid dimer is loaded onto the porous substrate through the exchange between the carboxyl group and the hydroxyl group; and when the porous substrate comprises zeolite materials, the carboxylic acid dimer is loaded onto the porous substrate through the coordination of the carboxyl group and aluminum or silicon.

In a class of this embodiment, the porous substrate comprises at least one adsorbent material selected from the group consisting of silica (Santa Barbara Amorphous-15, also known as SBA-15), macro porous styrene resin (MP resin), charcoal (WS), chitosan, activated carbon, and zeolite;

the SBA-15 has a specific surface area of 1000-1050 $m^2/g$, with an average pore diameter of 6.5-7 nm;

the MP resin has a specific surface area of 25-30 $m^2/g$, with an average pore diameter of 10.5-12 nm;

the charcoal (WS) has a specific surface area of 30-50 $m^2/g$, with an average pore diameter of 5-7.5 nm;

the chitosan has a specific surface area of 105-150 $m^2/g$, with an average pore diameter of 4.6-5.2 nm;

the activated carbon has a specific surface area of 1200-1300 $m^2/g$, with an average pore diameter of 3.5-4.0 nm; and the zeolite has a specific surface area of 25-35 $m^2/g$, with an average pore diameter of 2.0-3.0 nm.

In a class of this embodiment, the SBA-15 comprising the carboxylic acid dimer has a specific surface area of 760-800 m²/g, with an average pore diameter of 5-6 nm;

the MP resin comprising the carboxylic acid dimer has a specific surface area of 10-15 m²/g, with an average pore diameter of 5.5-6 nm;

the charcoal comprising the carboxylic acid dimer has a specific surface area of 20-30 m²/g, with an average pore diameter of 8.5-10 nm;

the chitosan comprising the carboxylic acid dimer has a specific surface area of 55-120 m²/g, with an average pore diameter of 3.8-4.5 nm;

the activated carbon comprising the carboxylic acid dimer has a specific surface area of 900-1000 m²/g, with an average pore diameter of 2.0-3.0 nm; and the zeolite comprising the carboxylic acid dimer has a specific surface area of 18-26 m²/g, with an average pore diameter of 1.6-2.2 nm.

The disclosure also provides a method for preparing the adsorbent, the method comprising:

1) preparing a dispersion or emulsion comprising the adsorbent material and a carboxylic acid; and 2) placing the dispersion in a sealed reactor at certain temperatures, thereby obtaining an adsorbent comprising the carboxylic acid dimer; or dropwise adding the emulsion to a cross-linking reagent to obtain an adsorbent comprising the carboxylic acid dimer;

the carboxylic acid comprises at least three carboxylic groups.

In a class of this embodiment, the carboxylic acid comprises an even number of carboxyl groups which are symmetrically distributed in a molecular structure of the carboxylic acid.

In a class of this embodiment, in 2), the dispersion is placed in a reaction kettle for hydrothermal reaction; or the dispersion or the emulsion is heated in a reflux apparatus;

the hydrothermal reaction is carried out at a temperature of 250-350° C.; and the reflux apparatus is heated to a temperature of 90-105° C.

In a class of this embodiment, when the porous substrate comprises the silica materials, the method of preparing the adsorbent comprises:

1) using toluene as a solvent to prepare the dispersion comprising the silica materials, a grafted raw material, and the carboxylic acid; and 2) transferring the dispersion in a reflux apparatus, and heating the reflux apparatus until the reflux reaction is complete, thereby obtaining an adsorbent comprising the carboxylic acid dimer; and the mass ratio of the silica materials to the grafted raw material to the carboxylic acid is 4:4-10:1-4.

In a class of this embodiment, when the porous substrate comprises porous resin materials, the method of preparing the adsorbent comprises:

1) preparing the dispersion comprising a porous resin, dichloromethane and the carboxylic acid;

2) stirring the dispersion at 70-90° C. for 6 hours, transferring the stirred dispersion in a reflux apparatus, and heating the reflux apparatus to the temperature of 105° C. at a rate of 2-5° C./h until the reflux reaction is complete, thereby obtaining an adsorbent comprising the carboxylic acid dimer; and the mass ratio of the porous resin to dichloromethane to the carboxylic acid is 4:4-10:1-4.

In a class of this embodiment, when the porous substrate comprises the charcoal materials or the activated carbon materials, the method of preparing the adsorbent comprises:

1) preparing the dispersion comprising the charcoal materials or the activated carbon materials, and the carboxylic acid; and 2) transferring the dispersion in a reaction kettle, and heating the dispersion at 300° C. for 3 hours for hydrothermal reaction; and the mass ratio of the charcoal materials or the activated carbon materials to the carboxylic acid is 4:1-4.

In a class of this embodiment, when the porous substrate comprises chitosan materials, the method of preparing the adsorbent comprises:

1) preparing a solution comprising the chitosan materials, acetic acid solution, a porogen, and the carboxylic acid; and stirring the solution at 40-60° C. for 10-20 minutes, thereby obtaining an emulsion;

2) using a glutaraldehyde solution as a cross-linking agent, dropwise adding the glutaraldehyde solution to the emulsion and allowing to cure for 25-30 minutes, thereby obtaining an adsorbent comprising the carboxylic acid dimer;

the mass ratio of the chitosan materials to the acetic acid solution to the porogen and to the carboxylic acid is 2:1-2:1-5:1-4; the concentration of the glutaraldehyde solution is 1%-2%; and the volume ratio of the emulsion to the glutaraldehyde solution is 100:1-2.

In a class of this embodiment, when the porous substrate comprises the zeolite materials, the method of preparing the adsorbent comprises:

1) preparing the dispersion comprising the zeolite materials and the carboxylic acid; and 2) stirring the dispersion at 60° C. for 2-3 hours, transferring the stirred dispersion into a reflux apparatus, heating the reflux apparatus to the temperature of 90° C. at a rate of 5-15° C./h until the reflux reaction is complete, thereby obtaining an adsorbent comprising the carboxylic acid dimer;

the mass ratio of the zeolite materials to the carboxylic acid is 4:1-4.

In a class of this embodiment, the method of preparing the adsorbent further comprises filtering, washing, and drying.

In a class of this embodiment, the porous substrate comprises at least one adsorbent material selected from the group consisting of silica, porous resin, charcoal, chitosan, activated carbon, and zeolite.

The disclosure further provides a method of wastewater treatment with the adsorbent, the method comprising:

1) adding the adsorbent to wastewater comprising heavy metal ions;

2) when the adsorption is saturated with the heavy metal ions, removing the adsorbent from the wastewater, and regenerating the removed adsorbent;

the pH of the wastewater in 1) is between 4.0 and 10.0; and in 2), the adsorbent is regenerated with warm water at a temperature of less than 80° C.

In a class of this embodiment, the adsorbent is regenerated with warm water at 60-70° C. for 1-10 hours; and after 20 cycles of adsorbent-regeneration process, the desorption rate of the adsorbent decreases by less than 5%.

The heavy metal ions include, but are not limited to, $Hg^{2+}$, $Cu^{2+}$, $Ni^{2+}$, $Pb^{2+}$, $Cd^{2+}$, $Mn^{2+}$, $Fe^{3+}$, $Zn^{2+}$ and $Cr^{3+}$.

The following advantages are associated with the adsorbent of the disclosure:

1. The adsorbent of the disclosure uses the acidic functional groups (such as a carboxyl group, hydroxyl group, etc.) present on the surface of the substrate to adsorb heavy metal ions; after adsorption, the adsorbent are taken out from the solvent and immersed in the water at a certain temperature; the carboxylic acid dimer in the adsorbent are destroyed as temperature increases, so that a large amount of hydrogen ions are released into the solvent and compete for sorption sites with the adsorbed heavy metal ions, thereby regenerating the adsorbent. The adsorbent solves the problems of unsatisfactory regeneration effect and secondary pollution of the regenerant, and achieves the purpose of green generation.

2. In actual use, the MOF material is difficult to recycle because it is in powder form. The adsorbent of the disclosure is made into larger block or spherical shape, which is more convenient for recovery and recycling compared with the MOF material with carboxylic acid dimer.

3. The adsorbent of the disclosure comprises a substrate comprising silica materials, porous resin materials, charcoal materials, chitosan materials, activated carbon materials, or zeolite materials onto which the carboxylic acid dimer is loaded. Desorption of the adsorbent occurs at lower temperatures compared with the MOF material, which allows the adsorbents to maintain adsorption efficiency, desorption efficiency, and structural stability during the recycling and reusing processes. In addition, the cost of the substrate of the disclosure is lower than the MOF material.

DETAILED DESCRIPTION

To further illustrate the disclosure, embodiments detailing an adsorbent comprising the carboxylic acid dimer, and preparation method thereof are described below. It should be noted that the following embodiments are intended to describe and not to limit the disclosure.

In the disclosure, "not lower or higher than a value" means that the value is also included, for example, "not less than 12 hours" means that "equal to or longer than 12 hours".

In the disclosure, "lower or higher than a value" means that the value is not included.

Those skilled in the art should understand that the silica materials comprise silica material (SBA-15) or the surface modification materials thereof; the silica material is a kind of hard silicic acid polymer particles with an amorphous morphology like chain or network. The molecular formula of the silica material is $SiO_2 \cdot nH_2O$, which is a hydrophilic polar adsorbent. A method for preparing the silica material comprises: adding triblock copolymer P123, tetraethyl orthosilicate (TEOS), ultrapure water, and HCl into a reaction kettle in a mass ratio of 0.5:2:32:6, thoroughly stirring the mixture for 1 hour, and heating the stirred mixture in an oven at 90° C. for 24 hours. It should be noted that the method for preparing silica material is not limited to the particular example discussed above.

Figure 14:
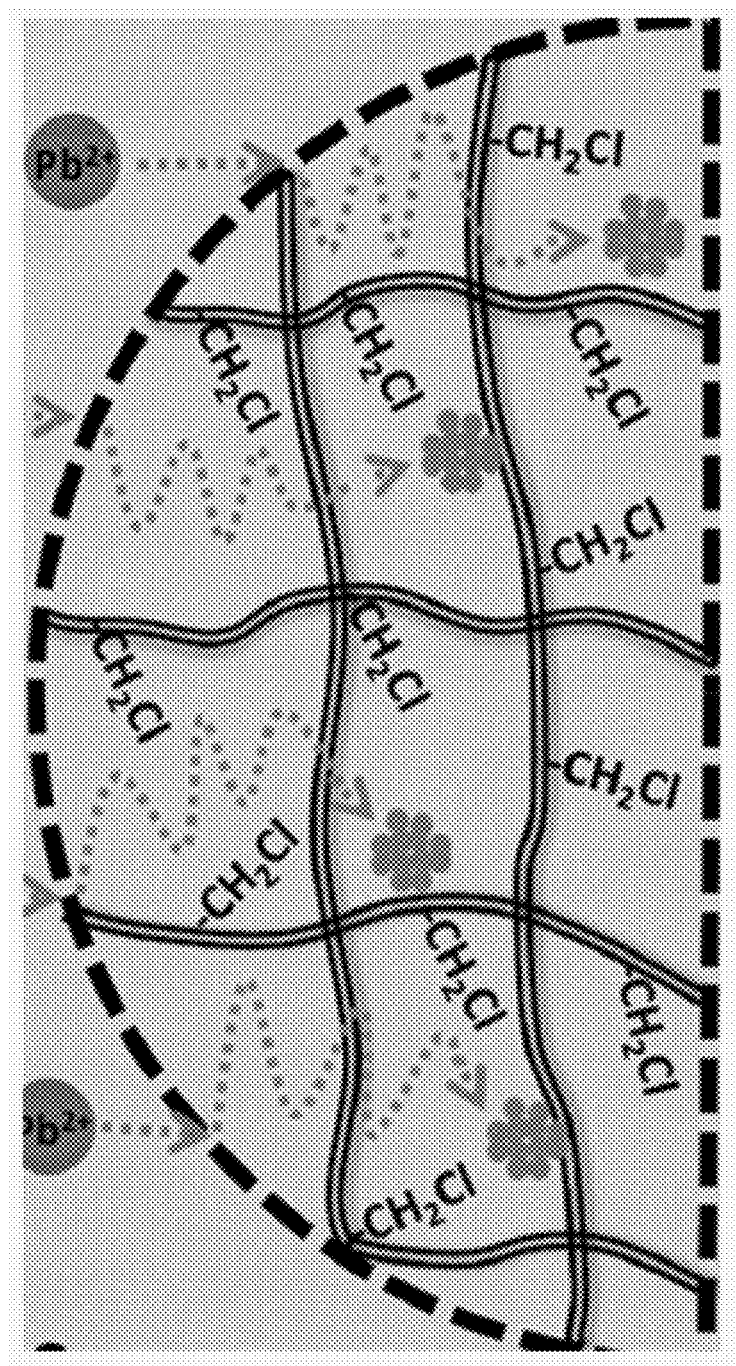
FIG. 14 is a schematic diagram illustrating a structure of MP resin immersed in dichloromethane in accordance one example of the disclosure.

Those skilled in the art should understand that the porous resin materials comprise porous resin or the materials modified from the porous resin. The porous resin is a kind of highly cross-linked copolymer beads in which comprises channels for adsorption at a molecular level. Preferably, the porous resin is macroporous polystyrene (MP resin), also known as macroreticular adsorbent resin, polymeric adsorbing resin, and polymeric adsorbent, which is a macroreticular polymer resin without ion-exchange groups. The structure of the MP resin varies with different monomers, and the porosity and specific surface area of the MP resin depend on the porogens and synthesis processes. Referring to FIG. 14, the macroporous styrene resin is immersed in dichloromethane so that —$CH_2Cl$ can be ligated to resin skeleton and allows the molecular to more easily exchange groups. For example, the carboxylic acid dimer is loaded onto the MP resin through the exchange between carboxyl groups and —$CH_2Cl$.

Those skilled in the art should understand that the charcoal materials comprise charcoal or the materials modified from the charcoal. The charcoal is a solid that is produced by pyrolysis of biomass in the absence of oxygen. The solid is a refractory, stable, highly aromatic, and high-carbon residue which is rich in functional groups (e.g. carboxyl and hydroxyl groups, etc.). A method for preparing the charcoal WS comprises: placing 1.0 g of wheat straw (WS) into a carbonization furnace for pyrolysis for 30 minutes; grinding the resulting product into powder; and drying the powder at 60° C. for 3 days. It should be noted that the method for preparing the charcoal WS is not limited to the particular example discussed above.

The chitosan materials of the disclosure refer to a block of cross-linked chitosan. Those skilled in the art should understand that the chitosan materials comprise chitosan or the materials modified from the chitosan. The chitosan is a natural polymer and an important chitin derivative. Hydroxyl and amino groups are distributed along the macromolecular chain of chitosan, and the chitosan forms clathrate-like structure by hydrogen bonds or salt bonds.

Those skilled in the art should understand that the activated carbon materials comprise activated carbon or the materials modified from the activated carbon. The activated carbon is a black, non-toxic and tasteless substance produced through carbonization and activation of charcoal, wood chips, fruit shells and coal. The activated carbon has a non-polar surface, a specific surface area of greater than 500 $m^2/g$, and more microscopic pores (capillary pores), which possesses good chemical stability and mechanical strength.

Those skilled in the art should understand that the zeolite materials comprise zeolite or the materials modified from zeolite. The zeolite is a crystalline aluminosilicate with two main components of $SiO_2$ and $Al_2O_3$, and is a molecular sieve adsorbent having a structure perforated with specific molecule-sized pores with the same diameter.

Example 1

Figure 1:
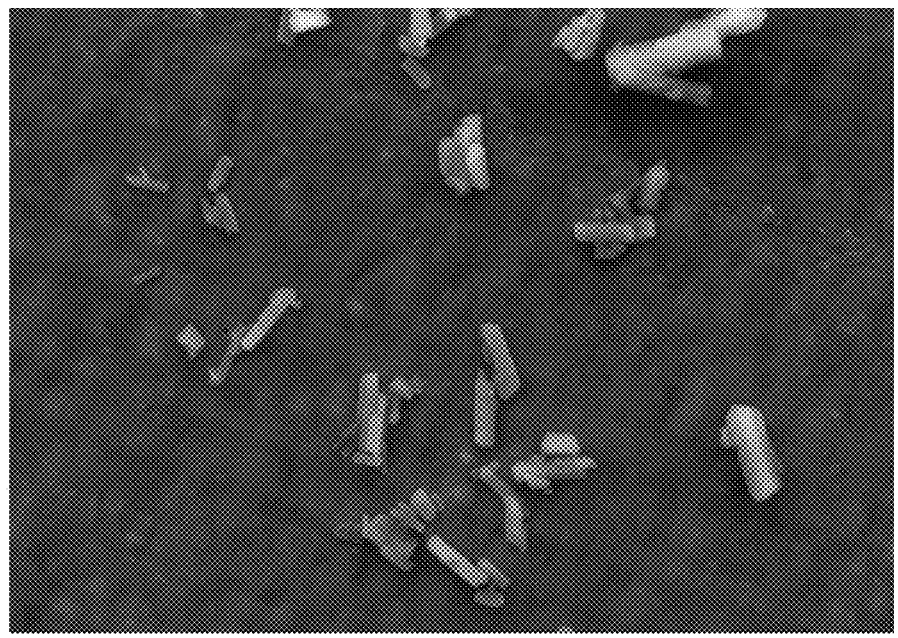
FIG. 1 is a scanning electron micrograph of SBA-15 comprising the carboxylic acid dimer in accordance with Example 1 of the disclosure.

A method for preparing SBA-15 comprising the carboxylic acid dimer comprises:

SBA-15,3-aminopropyltriethylsilane (APTES), and pyromellitic acid were added in a mass ratio of 4:4:1 to 150 ml of toluene solution; the mixture was heated to 100° C., stirred and refluxed for 2 hours, filtered, washed twice with ethanol, washed several times with deionized water, and dried at 80° C. to yield SBA-15 comprising the carboxylic acid dimer (as shown in FIG. 1).

Figure 4:
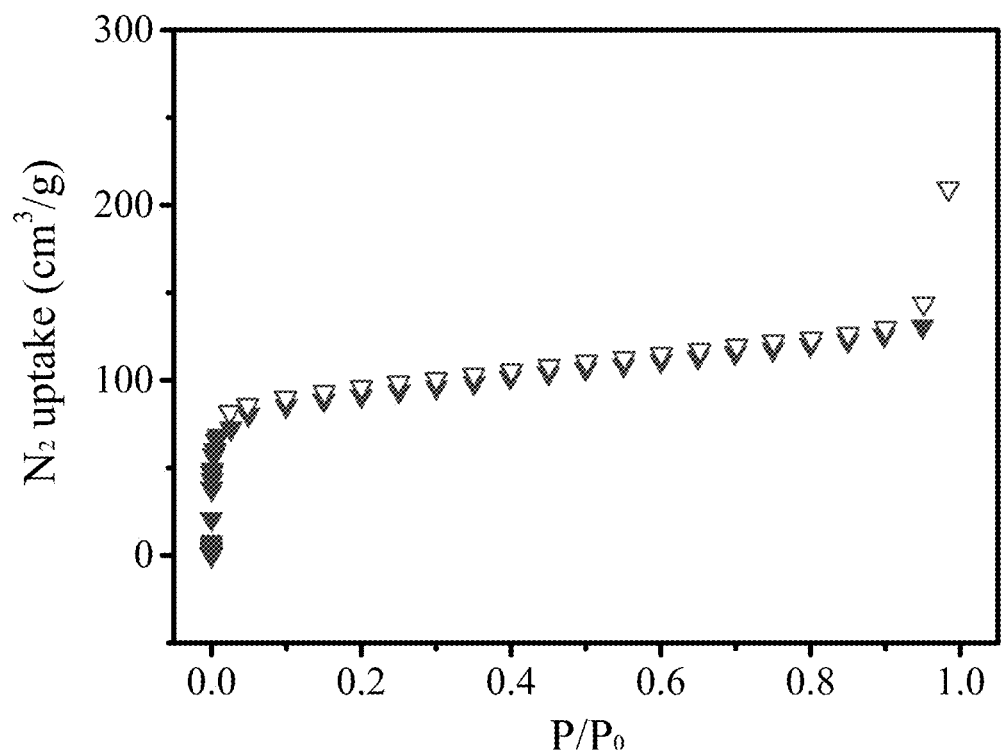
FIG. 4 is a scatter plot illustrating the specific surface area of SBA-15 comprising the carboxylic acid dimer in accordance with Example 1 of the disclosure.

FIG. 4 is a scatter plot illustrating the specific surface area of SBA-15 comprising the carboxylic acid dimer in accordance with Example 1 of the disclosure, wherein the SBA-15 with carboxylic acid dimer has a specific surface area of 780 $m^2/g$.

A method for treating $Pb^{2+}$-containing wastewater using the SBA-15 comprising the carboxylic acid dimer comprises:

1) influent wastewater: the pH of the influent wastewater was adjusted to 4; 1 g of the SBA-15 with carboxylic acid dimer was placed into a jacketed glass adsorption column; the influent wastewater was flowed through the jacketed glass adsorption column at a flow rate of 50 $L/m^2$ h at room temperature (25° C.); and 2) adsorption and regeneration: after 3 hours of adsorption, the influent wastewater supply was cut off; and the SBA-15 comprising the carboxylic acid dimer was transferred from the jacketed glass adsorption column into the hot water at 60° C. for 1 hour.

The results show that the SBA-15 with carboxylic acid dimer removes 90% of the lead ions ($Pb^{2+}$) from the influent wastewater and the regeneration rate is 60%.

Figure 5:
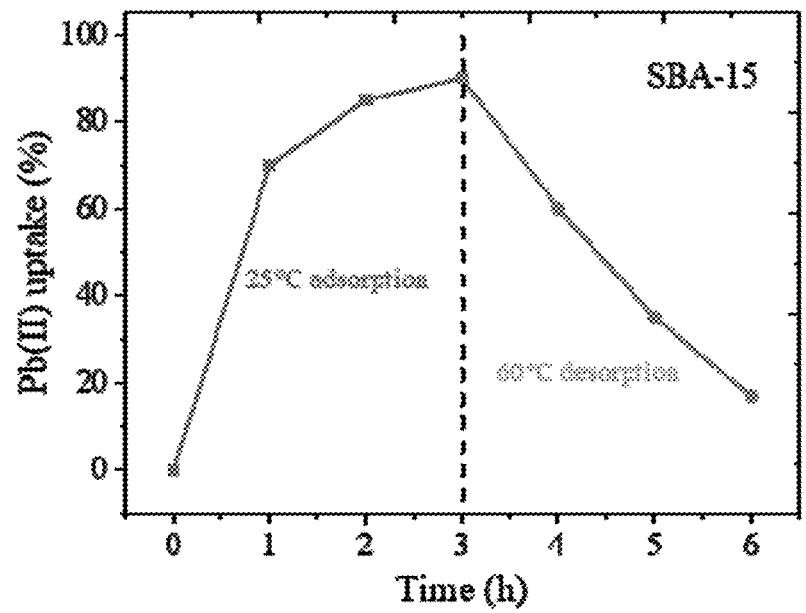
FIG. 5 is a line graph illustrating adsorption and desorption efficiency of SBA-15 comprising the carboxylic acid dimer in the removal of $Pb^{2+}$ in accordance with Example 1 of the disclosure.

FIG. 5 is a line graph illustrating adsorption and desorption efficiency of SBA-15 with carboxylic acid dimer in the removal of $Pb^{2+}$ in accordance with Example 1 of the disclosure. Referring to FIG. 5, when the ambient temperature is 25° C., the rate of removal of $Pb^{2+}$ from the wastewater by the SBA-15 with carboxylic acid dimer reaches to 95% within 3 hours. When the reaction temperature is increased to 60° C., $Pb^{2+}$ is desorbed from the surface of the SBA-15 with carboxylic acid dimer and gets into the wastewater. The rate of desorption of $Pb^{2+}$ from the SBA-15 comprising the carboxylic acid dimer exceeds 90% within 3 hours, indicating that the SBA-15 comprising the carboxylic acid dimer has excellent $Pb^{2+}$ adsorption and desorption efficiency.

Example 2

A method for preparing SBA-15 comprising the carboxylic acid dimer comprises:

SBA-15,3-aminopropyltriethylsilane (APTES), and pyromellitic acid were added in a mass ratio of 4:8:2 to 150 ml of toluene solution; the mixture was heated to 100° C., stirred and refluxed for 5 hours, filtered, washed twice with ethanol, washed several times with deionized water, and dried at 80° C. to yield SBA-15 comprising the carboxylic acid dimer.

In the example, the SBA-15 comprising the carboxylic acid dimer has a specific surface area of 800 $m^2/g$, with an average pore diameter of 5.5 nm.

A method for treating $Pb^{2+}$-containing wastewater using the SBA-15 comprising the carboxylic acid dimer comprises:

1) the pH of the influent wastewater was adjusted to 6; 2 g of the SBA-15 with carboxylic acid dimer was placed into a jacketed glass adsorption column, and the influent wastewater was flowed through the jacketed glass adsorption column at a flow rate of 100 $L/m^2$ h at room temperature (25° C.); and 2) after 6 hours of adsorption, the influent wastewater supply was cut off; and the SBA-15 comprising the carboxylic acid dimer was transferred from the jacketed glass adsorption column into the hot water at 70° C. for 5 hours.

The results show that the SBA-15 comprising the carboxylic acid dimer removes 95% of $Pb^{2+}$ from the influent wastewater.

The rate of regeneration of the SBA-15 comprising the carboxylic acid dimer is 80%.

Example 3

A method for preparing SBA-15 comprising the carboxylic acid dimer comprises:

SBA-15,3-aminopropyltriethylsilane (APTES), and pyromellitic acid were added in a mass ratio of 4:10:4 to 150 ml of toluene solution; the mixture was heated to 100° C., stirred and refluxed for 10 hours, filtered, washed twice with ethanol, washed several times with deionized water, and dried at 80° C. to yield SBA-15 comprising the carboxylic acid dimer.

In this example, the SBA-15 comprising the carboxylic acid dimer has a specific surface area of 760 $m^2/g$, with an average pore diameter of 6.0 nm.

A method for treating $Pb^{2+}$-containing wastewater using the SBA-15 comprising the carboxylic acid dimer comprises:

1) the pH of the influent wastewater was adjusted to 8; 2 g of the SBA-15 comprising the carboxylic acid dimer was placed into a jacketed glass adsorption column, and the influent wastewater was flowed through the jacketed glass adsorption column at a flow rate of 200 L/m² h at room temperature (25° C.); and 2) after 24 hours of adsorption, the influent wastewater supply was cut off; and the SBA-15 comprising the carboxylic acid dimer was transferred from the jacketed glass adsorption column into the hot water at 70° C. for 6 hours.

The results show that the SBA-15 comprising the carboxylic acid dimer removes more than 95% of $Pb^{2+}$ from the influent wastewater.

The rate of regeneration of the SBA-15 comprising the carboxylic acid dimer exceeds 90%.

Example 4

Figure 2:
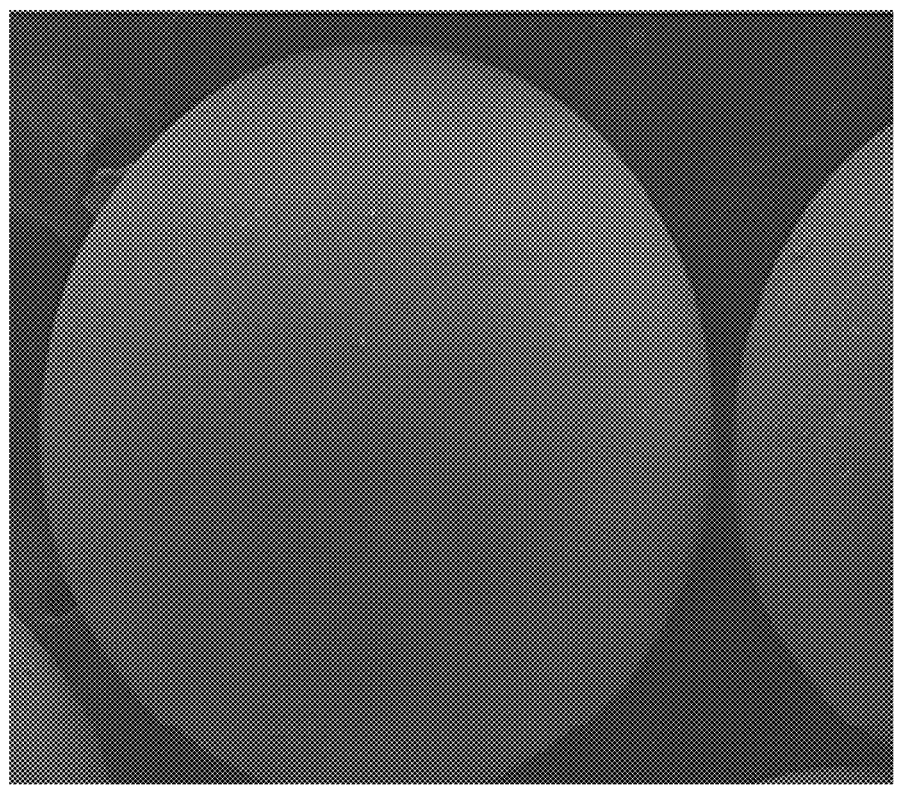
FIG. 2 is a scanning electron micrograph of MP resin comprising the carboxylic acid dimer in accordance with Example 4 of the disclosure.

A method for preparing MP resin (vinyl chloride-isobutyl vinyl ether copolymer resin) comprising the carboxylic acid dimer comprises:

2.5 g of MP resin was immersed in 25 mL of dichloroethane for 12 hours, followed by addition of 1.2 g of pyromellitic acid. The mixture was heated to 80° C., thoroughly stirred for 6 hours, heated to 105° C. at a rate of 2° C./h, held at 105° C. for 2 hours, refluxed for 2 hours, filtered, washed several times with methanol, washed several times with ultrapure water, and dried at 60° C. overnight to yield a MP resin comprising the carboxylic acid dimer as shown in FIG. 2.

In the example, the MP resin with carboxylic acid dimer has a specific surface area of 19.8 m²/g, with an average pore diameter of 9.17 nm and a pore volume of 0.069 cm³/g.

A method for treating $Pb^{2+}$-containing wastewater using the MP resin with carboxylic acid dimer comprises:

1) the pH of the influent wastewater was adjusted to 5.5; 2 g of MP resin comprising the carboxylic acid dimer was placed into a jacketed glass adsorption column, and the influent wastewater was flowed through the jacketed glass adsorption column at a flow rate of 200 L/m² h at room temperature (25° C.); and 2) after adsorption for 24 hours, the influent wastewater supply was cut off; and the MP resin comprising the carboxylic acid dimer was transferred from the jacketed glass adsorption column into the hot water at 70° C. for 5 hours.

The results show that the MP resin comprising the carboxylic acid dimer removes more than 95% of the $Pb^{2+}$ from the influent wastewater.

Figure 6:
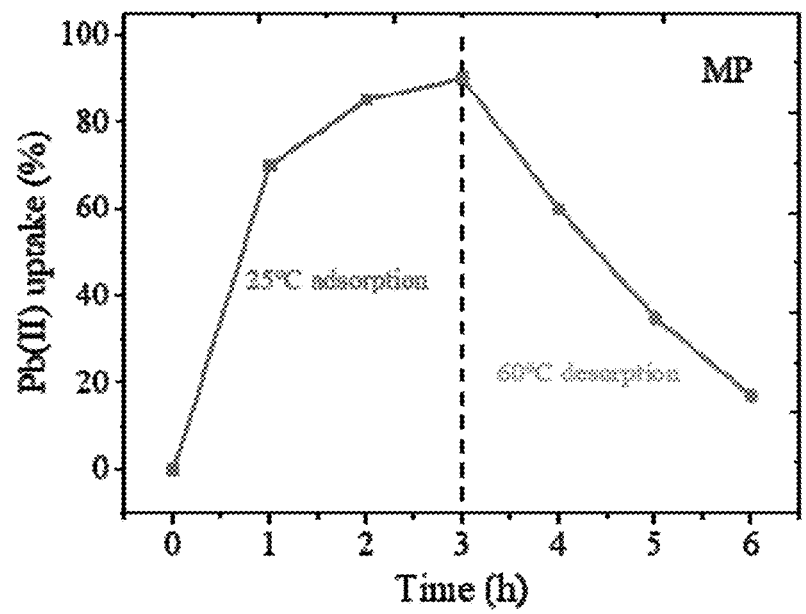
FIG. 6 is a line graph illustrating adsorption and desorption efficiency of MP resin comprising the carboxylic acid dimer in the removal of $Pb^{2+}$ in accordance with Example 4 of the disclosure.

The rate of regeneration of the MP resin comprising the carboxylic acid dimer exceeds 80% (as shown in FIG. 6).

Example 5

Figure 3:
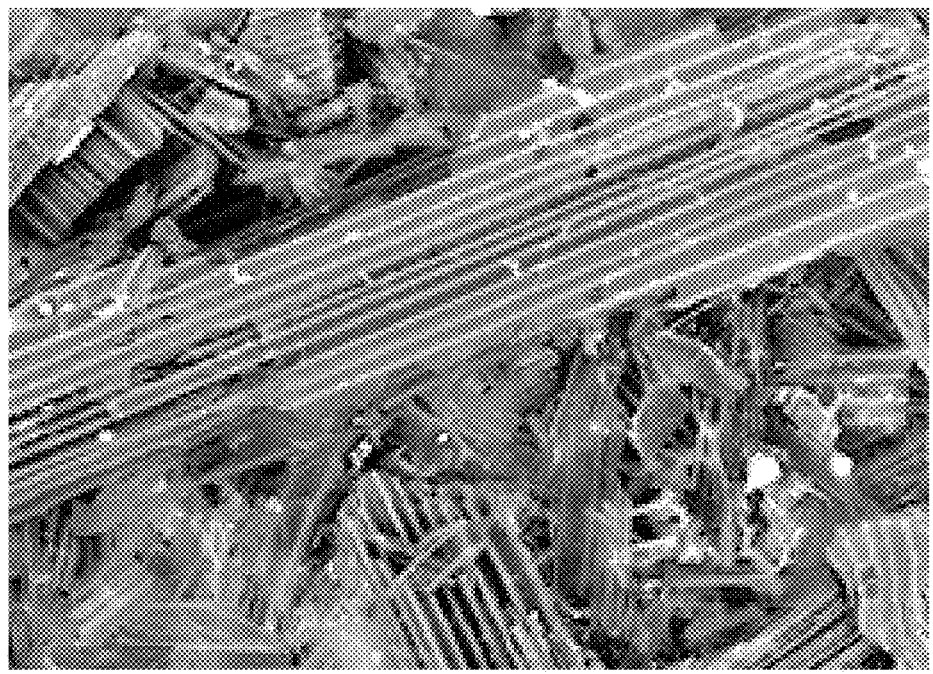
FIG. 3 is a scanning electron micrograph of WS comprising the carboxylic acid dimer in accordance with Example 5 of the disclosure.

A method for preparing WS comprising the carboxylic acid dimer comprises:

1.0 g of WS was mixed with 0.5 g of pyromellitic acid and allowed to perform hydrothermal reaction at 300° C. for 3 hours. The resulting product was washed several times with ultrapure water and vacuum dried at 80° C. overnight to yield a WS power comprising the carboxylic acid dimer as shown in FIG. 3.

In the example, the WS comprising the carboxylic acid dimer has a specific surface area of 26.0 m²/g, with a pore volume of 0.01 cm³/g.

A method for treating $Pb^{2+}$-containing wastewater using the WS comprising the carboxylic acid dimer comprises:

1) the pH of the influent wastewater was adjusted to 5.0; 2 g of the WS with carboxylic acid dimer was placed into a jacketed glass adsorption column, and the influent wastewater was flowed through the jacketed glass adsorption column at a flow rate of 200 L/m² h at room temperature (25° C.); and 2) after 24 hours of adsorption, the influent wastewater supply was cut off; and the WS comprising the carboxylic acid dimer was transferred from the jacketed glass adsorption column into the hot water at 70° C. for 6 hours.

The results show that the WS comprising the carboxylic acid dimer removes more than 95% of the $Pb^{2+}$ from the influent wastewater.

Figure 7:
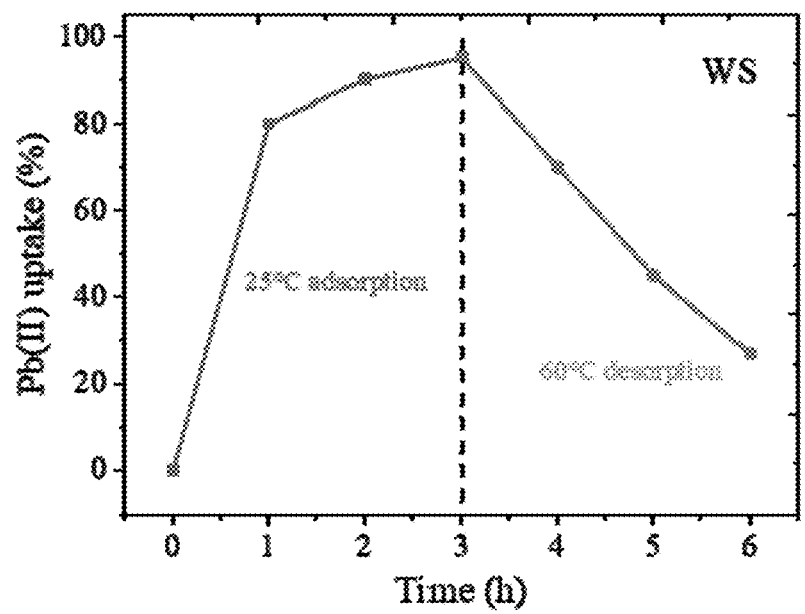
FIG. 7 is a line graph illustrating adsorption and desorption efficiency of WS comprising the carboxylic acid dimer in the removal of $Pb^{2+}$ in accordance with Example 5 of the disclosure.

The rate of regeneration of the WS comprising the carboxylic acid dimer exceeds 70% (as shown in FIG. 7).

Example 6

A method for preparing chitosan comprising the carboxylic acid dimer comprises:

1.0 g of chitosan was added to 100 mL of acetic acid solution with a mass fraction of 2%, followed by addition of porogen and 0.5 g of pyromellitic acid. The mixture was stirred at 40° C. for 20 minutes to form an emulsion. 1 mL of glutaraldehyde solution was added dropwise into the emulsion for curing for 30 minutes. The resulting product was washed several times with ultrapure water and vacuum dried at 80° C. overnight to yield chitosan comprising the carboxylic acid dimer.

In the example, the chitosan comprising the carboxylic acid dimer has a specific surface area of 86.0 m²/g, with a pore volume of 0.03 cm³/g.

A method for treating $Pb^{2+}$-containing wastewater using the chitosan with carboxylic acid dimer comprises:

1) the pH of the influent wastewater was adjusted to 5.0; 2 g of the chitosan with carboxylic acid dimer was placed into a jacketed glass adsorption column, and the influent wastewater was flowed through the jacketed glass adsorption column at a flow rate of 200 L/m² h at room temperature (25° C.); and 2) after 24 hours of adsorption, the influent wastewater supply was cut off; and the chitosan with carboxylic acid dimer was transferred from the jacketed glass adsorption column into the hot water at 70° C. for 6 hours.

The results show that the chitosan with carboxylic acid dimer removes more than 92% of the $Pb^{2+}$ from the influent wastewater.

Figure 8:
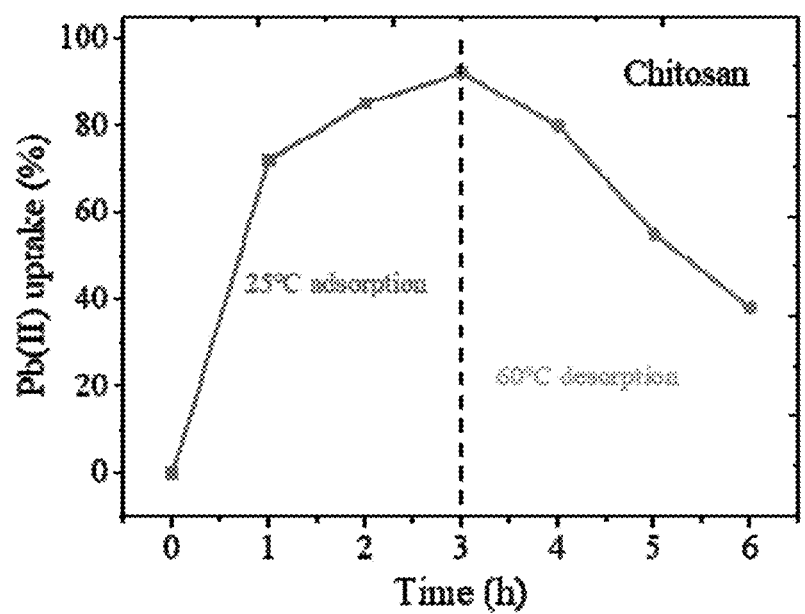
FIG. 8 is a line graph illustrating adsorption and desorption efficiency of chitosan comprising the carboxylic acid dimer in the removal of $Pb^{2+}$ in accordance with Example 6 of the disclosure.

The rate of regeneration of the chitosan comprising the carboxylic acid dimer exceeds 60% (as shown in FIG. 8).

Example 7

A method for preparing charcoal comprising the carboxylic acid dimer comprises:

Activation of activated carbon: granular activated carbon was immersed in nitric acid with a mass fraction of 10% for 24 hours, ultrasonically cleaned for 15 minutes, rinsed with distilled water until the filtrate was neutral, and dried at 100° C.

1.0 g of activated carbon after activation and 0.5 g of pyromellitic acid were added to 10 mL of ultrapure water and allowed to perform hydrothermal reaction at 300° C. for 3 hours. The resulting product was washed several times with ultrapure water and vacuum dried at 80° C. overnight to yield charcoal comprising the carboxylic acid dimer.

In the example, the charcoal comprising carboxylic acid dimer has a specific surface area of 832.0 m²/g, with a pore volume of 0.015 cm³/g.

A method for treating $Pb^{2+}$-containing wastewater using the charcoal comprising the carboxylic acid dimer comprises:

1) the pH of the influent wastewater was adjusted to 5.0; 2 g of the charcoal with carboxylic acid dimer was placed into a jacketed glass adsorption column, and the influent wastewater was flowed through the jacketed glass adsorption column at a flow rate of 200 L/m² h at room temperature (25° C.); and 2) after 24 hours of adsorption, the influent wastewater supply was cut off; and the charcoal comprising the carboxylic acid dimer was transferred from the jacketed glass adsorption column into the hot water at 70° C. for 6 hours.

The results show that the charcoal comprising the carboxylic acid dimer removes more than 96% of the $Pb^{2+}$ from the influent wastewater.

Figure 9:
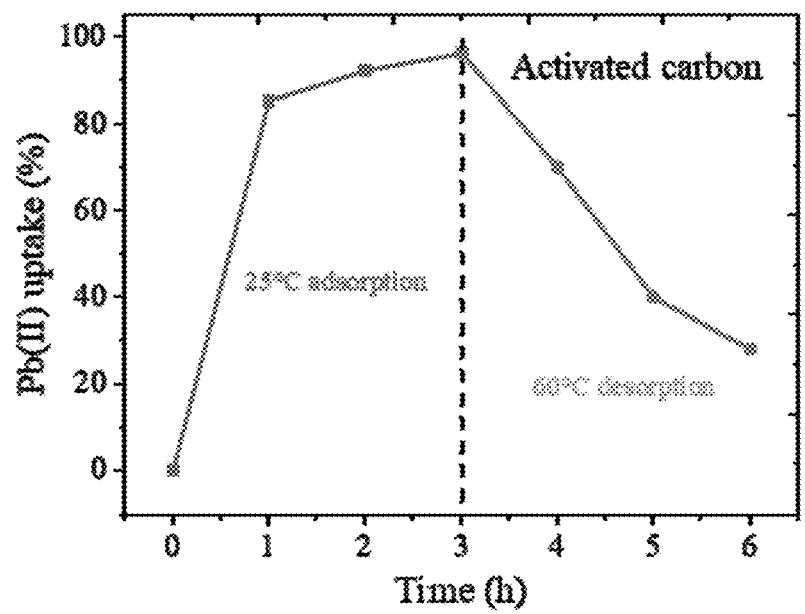
FIG. 9 is a line graph illustrating adsorption and desorption efficiency of activated carbon comprising the carboxylic acid dimer in the removal of $Pb^{2+}$ in accordance with Example 7 of the disclosure.

The rate of regeneration of the charcoal comprising the carboxylic acid dimer exceeds 75% (as shown in FIG. 9).

Example 8

A method for preparing zeolite comprising the carboxylic acid dimer comprises:

1.0 g of natural zeolite and 0.2 g of pyromellitic acid were added to 10 mL of ultrapure water. The mixture was heated to 60° C., thoroughly stirred for 2 hours, heated to 90° C. at a rate of 10° C./h, held at 90° C. for 1 hour, refluxed for 10 hours, filtered, washed several times with ultrapure water, dried at 80° C. overnight to yield a zeolite comprising the carboxylic acid dimer.

In the example, the zeolite comprising the carboxylic acid dimer has a specific surface area of 18.0 m²/g, with a pore volume of 0.018 cm³/g.

A method for treating wastewater containing $Pb^{2+}$ using the zeolite with carboxylic acid dimer comprises:

1) the pH of the influent wastewater was adjusted to 5.0; 2 g of the zeolite with carboxylic acid dimer was placed into a jacketed glass adsorption column, and the influent wastewater was flowed through the jacketed glass adsorption column at a flow rate of 200 L/m² h at room temperature (25° C.); and 2) after 24 hours of adsorption, the influent wastewater supply was cut off; and the zeolite with carboxylic acid dimer was transferred from the jacketed glass adsorption column into the hot water at 70° C. for 6 hours.

The results show that the zeolite comprising the carboxylic acid dimer removes more than 90% of the $Pb^{2+}$ from the influent wastewater.

Figure 10:
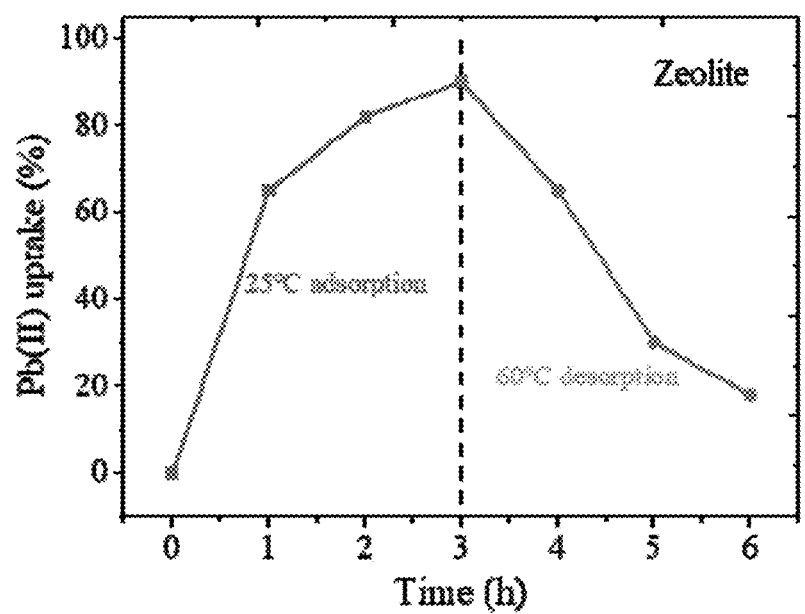
FIG. 10 is a line graph illustrating adsorption and desorption efficiency of zeolite comprising the carboxylic acid dimer in the removal of $Pb^{2+}$ in accordance with Example 7 of the disclosure.
Figure 11A:
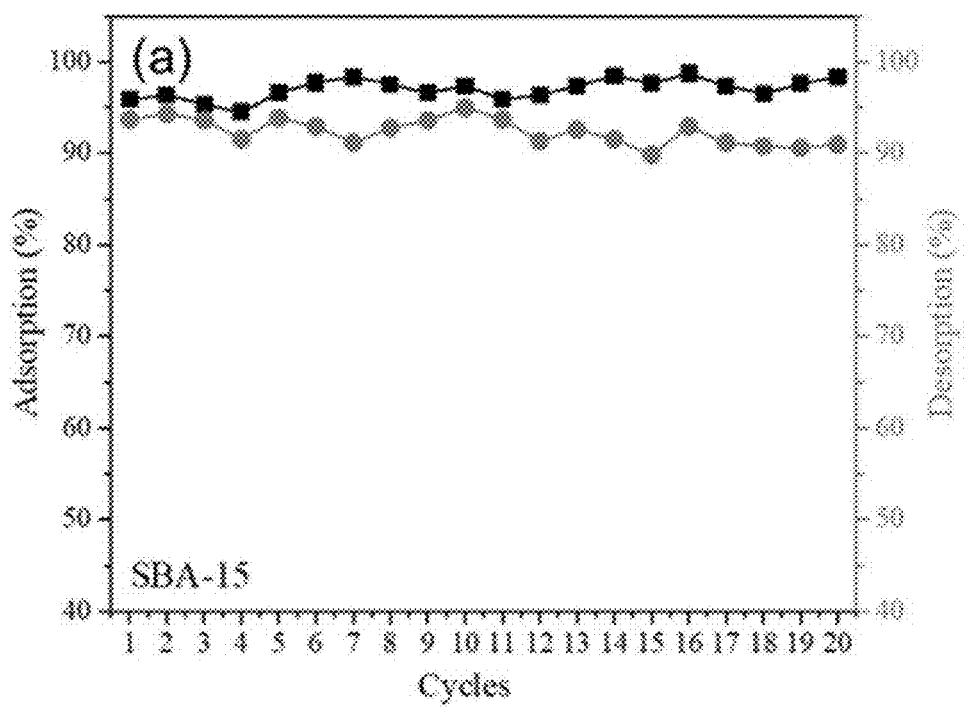
FIGS. 11A-11G are line graphs illustrating adsorption and desorption efficiency of adsorbents in the removal of $Pb^{2+}$ at each cycle in accordance with Example 11 of the disclosure; the adsorbents in FIGS. 11A-11G are the SBA-15 comprising the carboxylic acid dimer in Example 1, the MP resin comprising the carboxylic acid dimer in Example 4, the WS comprising the carboxylic acid dimer in Example 5, the chitosan comprising the carboxylic acid dimer in Example 6, the activated carbon comprising the carboxylic acid dimer in Example 7, the zeolite comprising the carboxylic acid dimer in Example 8, and the MIL-121 comprising the carboxylic acid dimer in Example 10, respectively.
Figure 11B:
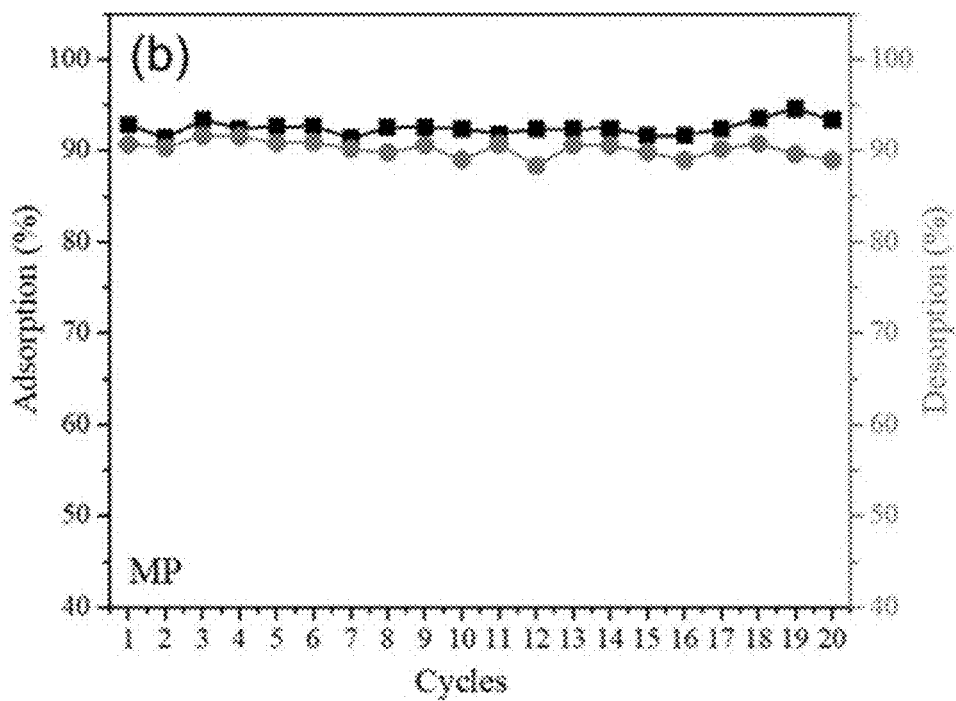
Figure 11C:
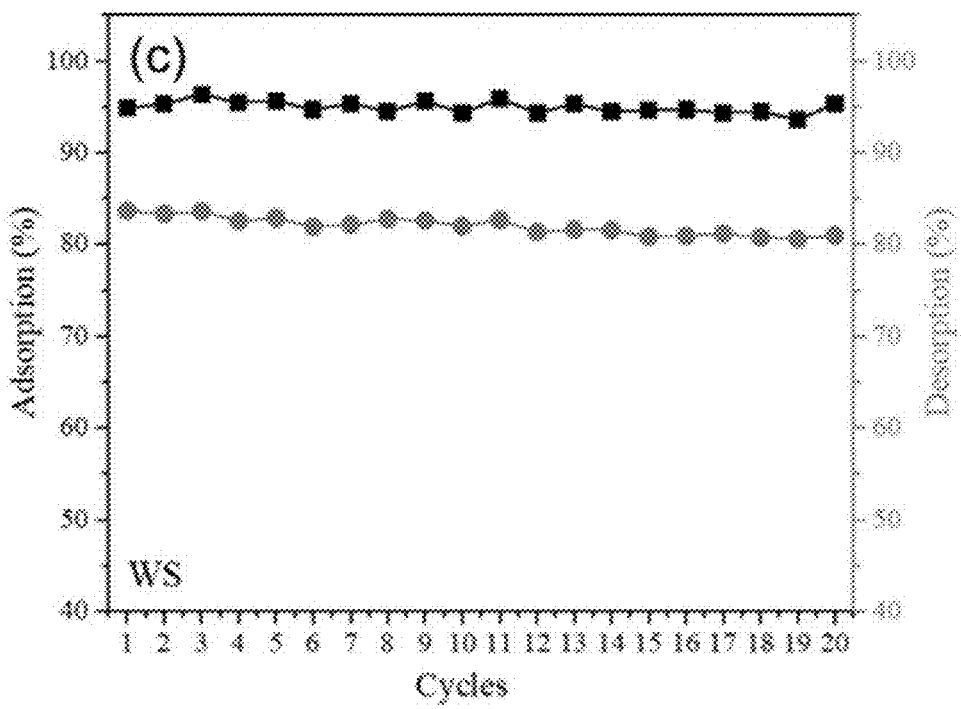
Figure 11D:
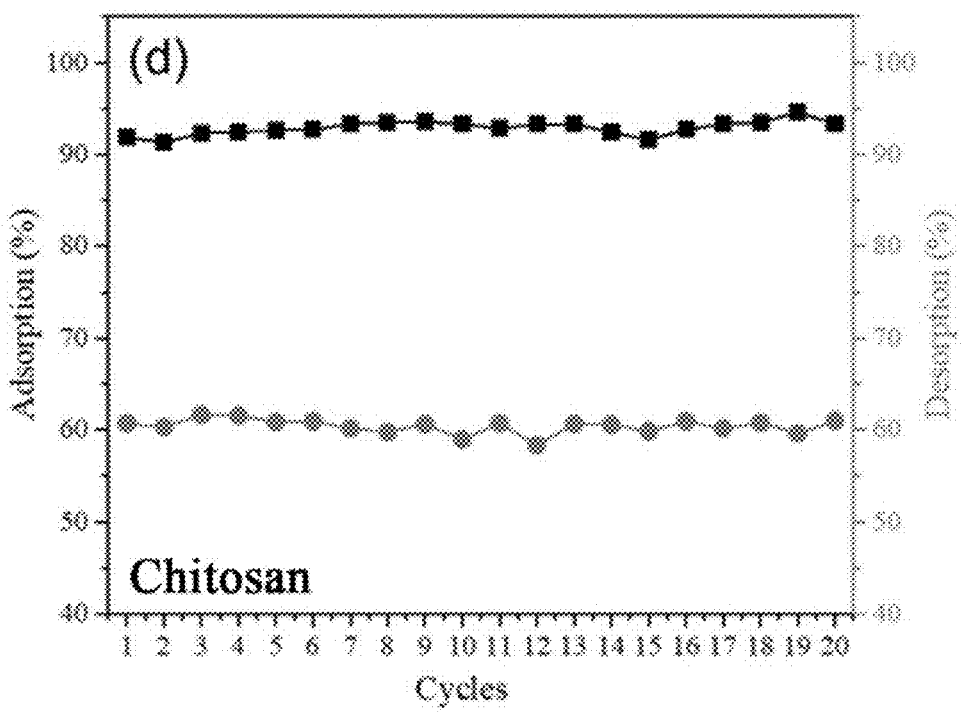
Figure 11E:
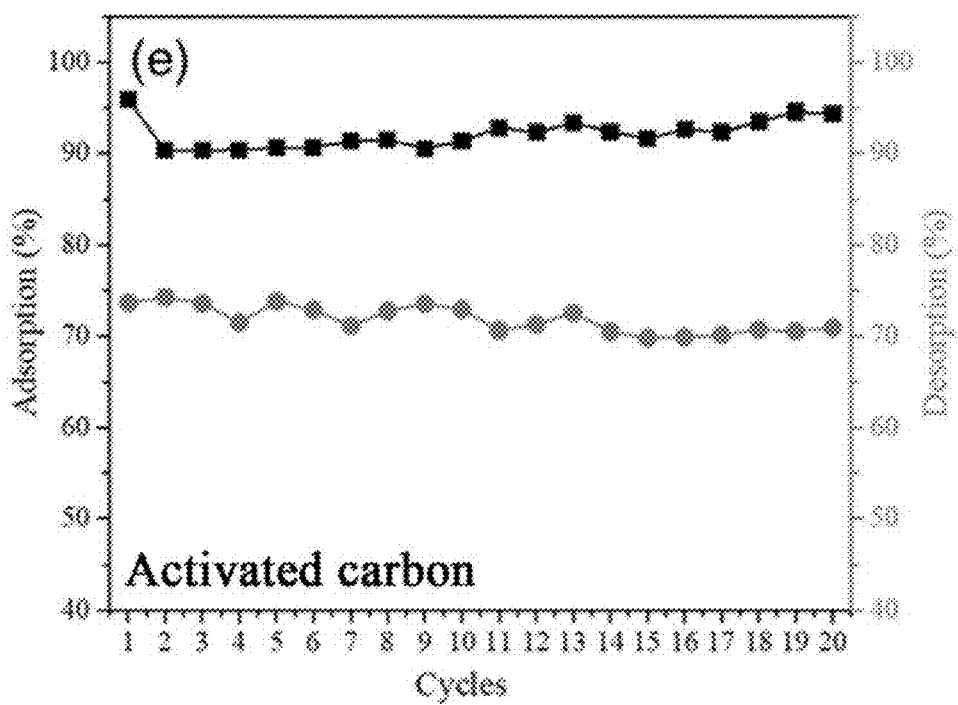
Figure 11F:
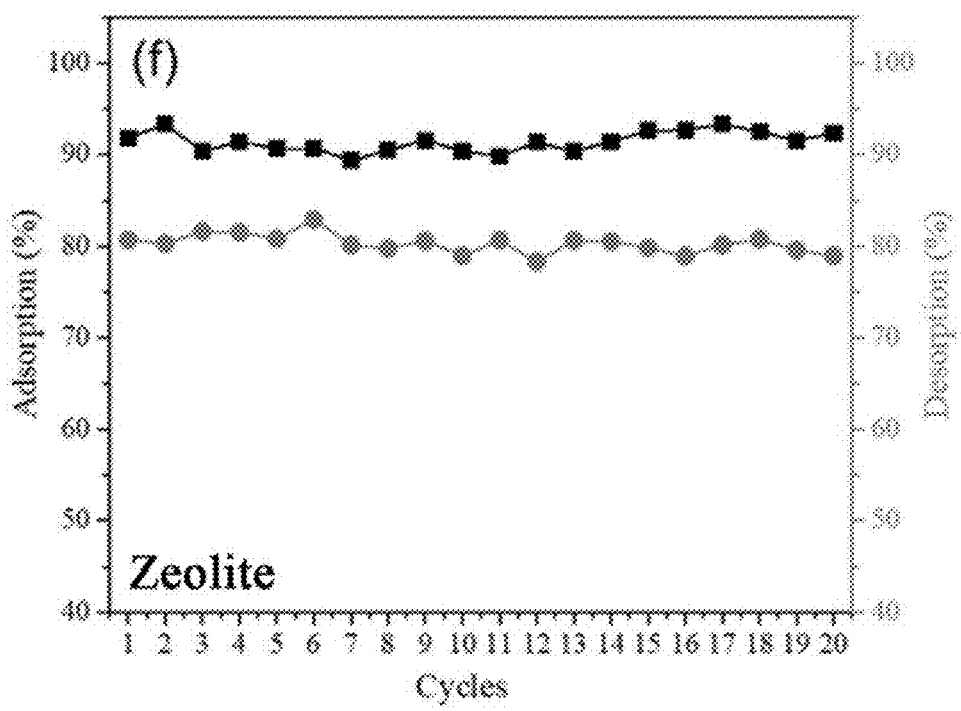
Figure 11G:
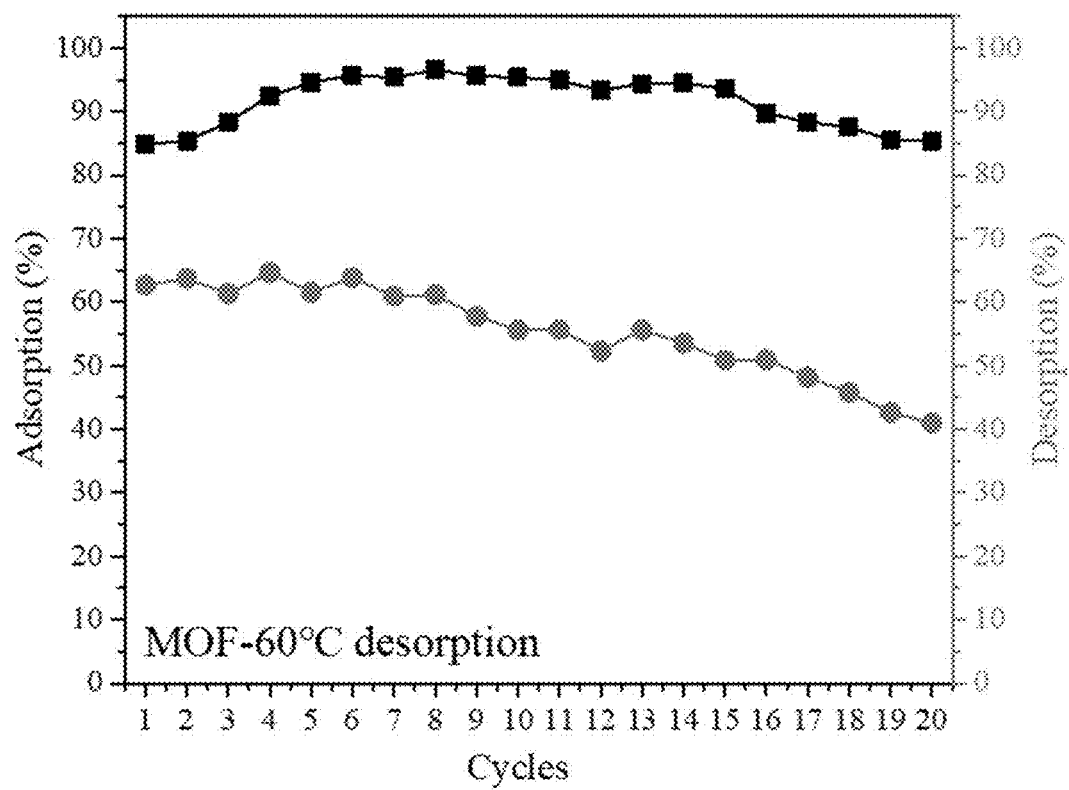

The rate of regeneration of the charcoal comprising the carboxylic acid dimer exceeds 80% (as shown in FIG. 10).

Example 9

The example is basically the same as that in Example 5, except that the wastewater in the example contains ionic contaminants including $Hg^{2+}$, $Ni^{2+}$, $Pb^{2+}$, $Cd^{2+}$, $Mn^{2+}$, $Fe^{3+}$, $Zn^{2+}$ and $Cu^{2+}$. The pH of the influent wastewater is adjusted to 5.0. The rates of removal of $Hg^{2+}$, $Ni^{2+}$, $Cd^{2+}$, $Mn^{2+}$, $Fe^{3+}$, $Co^{2+}$, $Zn^{2+}$ and $Cu^{2+}$ from the influent wastewater are 98%, 90%, 95%, 96%, 94%, 97%, and 97%, respectively. In the example, the rate of regeneration of the SBA-15 comprising the carboxylic acid dimer exceeds 95%.

Example 10

A method for preparing MOF comprising the carboxylic acid dimer comprises:

2.4 g of aluminum nitrate nonahydrate and 0.8 g of pyromellitic acid were added to 10 mL of ultrapure water. The mixture was thoroughly stirred, transferred into an oven at 200° C. for 30 hours. The resulting product was washed with ultrapure water until the pH of the filtrate was 4, and dried at 80° C. overnight to yield MOF (MIL-121) comprising the carboxylic acid dimer.

Example 11

In the example, a continuous adsorption-regeneration process was performed with the adsorbents including SBA-15 comprising the carboxylic acid dimer in Example 1, the MP resin comprising the carboxylic acid dimer in Example 4, the WS comprising the carboxylic acid dimer in Example 5, the chitosan comprising the carboxylic acid dimer in Example 6, the activated carbon comprising the carboxylic acid dimer in Example 7, and the MIL-121 comprising the carboxylic acid dimer in Example 10. The continuous adsorption-regeneration process comprises:

1) influent wastewater: 1 g of the adsorbent was placed into a jacketed glass adsorption column, and the influent wastewater was flowed through the jacketed glass adsorption column at a flow rate of 50 L/m² h at room temperature (25° C.); and 2) adsorption and regeneration: after 3 hours of adsorption, the influent wastewater supply was cut off was and the adsorbent was transferred from the jacketed glass adsorption column into the hot water at 60° C. for 1 hour.

FIG. 6 is a line graph comparing the stability of the MOF and the adsorbents (using silica, porous resin, charcoal, chitosan, activated carbon, and zeolite as a substrate) during 20 adsorption-regeneration cycles. The results show that the substrate has a stable structure and is easy to recycle. After 20 adsorption-regeneration cycles, the regeneration rate of the adsorbents is reduced by less than 5%. MIL-121 is regenerated with hot water at 60° C. and the regeneration rate is reduced to 40% after 20 adsorption-regeneration cycles, which is reduced by 25%, indicating that the change in the desorption temperature has an influence on the structure of MIL-121.

Example 12

In the example, the continuous adsorption-regeneration process was performed using the SBA-15 prepared in Example 1, which is basically the same as that in Example 11. The only difference is that, in 2) of Example 12, the SBA-15 comprising the carboxylic acid dimer was transferred from the jacketed glass adsorption column into the hot water at 80° C. for 1 hour.

Figure 12:
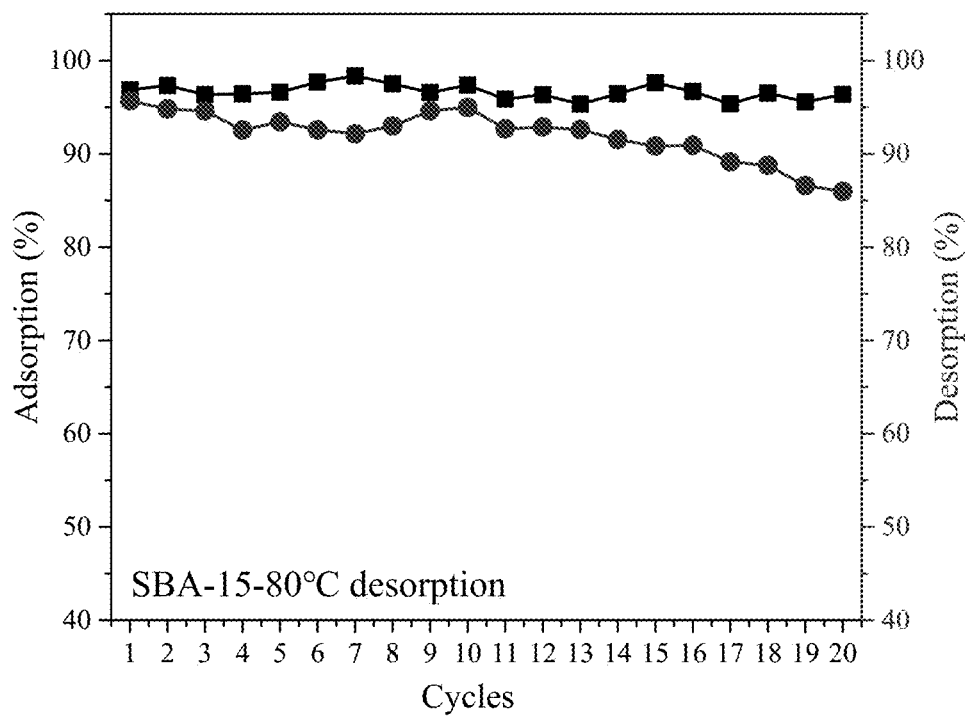
FIG. 12 is a line graph illustrating adsorption and desorption efficiency of SBA-15 comprising the carboxylic acid dimer in the removal of $Pb^{2+}$ at each cycle in accordance with Example 1 of the disclosure.

Referring to FIG. 12, the stability of adsorbents varies with temperature during regeneration, and is adversely affected at higher temperatures. The SBA-15 comprising the carboxylic acid dimer is regenerated in the hot water at 80° C. and achieves a regeneration rate of 85%, indicating desired stability of the adsorbent.

In the example, the continuous adsorption-regeneration process was also performed with MIL-121 prepared in Example 10, which is basically the same as that in Example 11. The only difference is that, in 2) of Example 12, the MIL-121 was transferred from the jacketed glass adsorption column into the hot water at 80° C. for 1 hour.

Figure 13:
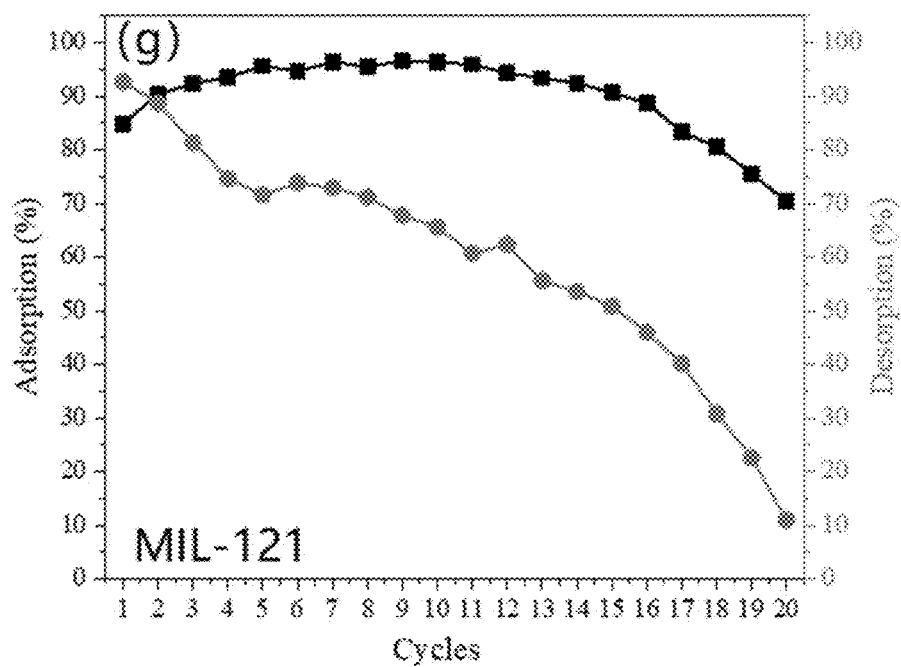
FIG. 13 is a line graph illustrating adsorption and desorption efficiency of MOF comprising the carboxylic acid dimer in the removal of $Pb^{2+}$ at each cycle in accordance with Example 10 of the disclosure.

Referring to FIG. 13, the MIL-121 is regenerated in the hot water at 80° C. after 20 adsorption-regeneration cycles, and the regeneration rate drops to 10%, indicating that the change in regeneration temperature has great effect on the structure of the MIL-121.

It will be obvious to those skilled in the art that changes and modifications may be made, and therefore, the aim in the appended claims is to cover all such changes and modifications.

What is claimed is:

1. An adsorbent, comprising a porous substrate and a carboxylic acid dimer; the porous substrate comprising a surface and a plurality of holes, and the carboxylic acid dimer being loaded onto the surface or in the plurality of holes of the porous substrate;
wherein:
an average pore size of the porous substrate is not smaller than 2 nm;
the carboxylic acid dimer is loaded onto the porous substrate by at least one of the following manners:
a) the carboxylic acid dimer is loaded onto the porous substrate through a Si—OH bond;
b) the carboxylic acid dimer is loaded onto the porous substrate through the exchange between a carboxyl group and chlorine;
c) the carboxylic acid dimer is loaded onto the porous substrate through the exchange between a carboxyl group and a hydroxyl group; and
d) the carboxylic acid dimer is loaded onto the porous substrate through the coordination of a carboxyl group and aluminum or silicon.

2. The adsorbent of claim 1, wherein the porous substrate comprises at least one adsorbent material selected from the group consisting of silica materials, porous resin materials, charcoal materials, chitosan materials, activated carbon materials, and zeolite materials;
when the porous substrate comprises silica materials, the carboxylic acid dimer is loaded onto the porous substrate through the Si—OH bond;
when the porous substrate comprises porous resin materials, the carboxylic acid dimer is loaded onto the porous substrate through the exchange between the carboxyl group and chlorine;
when the porous substrate comprises charcoal materials, the carboxylic acid dimer is loaded onto the porous substrate through the exchange between the carboxyl group and the hydroxyl group;
when the porous substrate comprises chitosan materials, the carboxylic acid dimer is loaded onto the porous substrate through the exchange between the carboxyl group and the hydroxyl group;
when the porous substrate comprises activated carbon materials, the carboxylic acid dimer is loaded onto the porous substrate through the exchange between the carboxyl group and the hydroxyl group; and
when the porous substrate comprises zeolite materials, the carboxylic acid dimer is loaded onto the porous substrate through the coordination of the carboxyl group and aluminum or silicon.

3. The adsorbent of claim 2, wherein:
the porous substrate comprises at least one adsorbent material selected from the group consisting of Santa Barbara Amorphous-15 (SBA-15), macro porous styrene resin (MP resin), charcoal, chitosan, activated carbon, and zeolite;
the SBA-15 has a specific surface area of 1000-1050 $m^2/g$, with an average pore diameter of 6.5-7 nm;
the MP resin has a specific surface area of 25-30 $m^2/g$, with an average pore diameter of 10.5-12 nm;
the charcoal has a specific surface area of 30-50 $m^2/g$, with an average pore diameter of 5-7.5 nm;
the chitosan has a specific surface area of 105-150 $m^2/g$, with an average pore diameter of 4.6-5.2 nm;
the activated carbon has a specific surface area of 1200-1300 $m^2/g$, with an average pore diameter of 3.5-4.0 nm; and
the zeolite has a specific surface area of 25-35 $m^2/g$, with an average pore diameter of 2.0-3.0 nm.

4. The adsorbent of claim 3, wherein:
the SBA-15 comprising the carboxylic acid dimer has a specific surface area of 760-800 $m^2/g$, with an average pore diameter of 5-6 nm;
the MP resin comprising the carboxylic acid dimer has a specific surface area of 10-15 $m^2/g$, with an average pore diameter of 5.5-6 nm;
the charcoal comprising the carboxylic acid dimer has a specific surface area of 20-30 $m^2/g$, with an average pore diameter of 8.5-10 nm;
the chitosan comprising the carboxylic acid dimer has a specific surface area of 55-120 $m^2/g$, with an average pore diameter of 3.8-4.5 nm;
the activated carbon comprising the carboxylic acid dimer has a specific surface area of 900-1000 $m^2/g$, with an average pore diameter of 2.0-3.0 nm; and
the zeolite comprising the carboxylic acid dimer has a specific surface area of 18-26 $m^2/g$, with an average pore diameter of 1.6-2.2 nm.

5. A method for preparing the adsorbent of claim 1, the method comprising:
1) preparing a dispersion or emulsion comprising the adsorbent material and a carboxylic acid; and
2) reacting the dispersion in a sealed reactor at certain temperatures, thereby obtaining an adsorbent comprising the carboxylic acid dimer; or dropwise adding the emulsion to a cross-linking reagent to obtain an adsorbent comprising the carboxylic acid dimer;
wherein, the carboxylic acid comprises at least three carboxylic groups.

6. The method of claim 5, wherein the carboxylic acid comprises an even number of carboxyl groups which are symmetrically distributed in a molecular structure of the carboxylic acid.

7. The method of claim 5, wherein in 2), the dispersion is placed in a reaction kettle for hydrothermal reaction at a temperature of 250-350° C.; or the dispersion or the emulsion is heated in a reflux apparatus at a temperature of 90-105° C.

8. The method of claim 5, wherein:
when the porous substrate comprises silica materials, the method of preparing the adsorbent comprises: 1) using toluene as a solvent to prepare the dispersion comprising the silica materials, a grafted raw material, and the carboxylic acid; and transferring the dispersion in a reflux apparatus, and heating the reflux apparatus until the reflux reaction is complete, thereby obtaining an adsorbent comprising the carboxylic acid dimer; and a mass ratio of the silica materials to the grafted raw material to the carboxylic acid is 4:4-10:1-4;
when the porous substrate comprises porous resin materials, the method of preparing the adsorbent comprises: 1) preparing the dispersion comprising a porous resin, dichloromethane and the carboxylic acid; 2) stirring the dispersion at 70-90° C. for 6 hours, transferring the stirred dispersion in a reflux apparatus, and heating the reflux apparatus to the temperature of 105° C. at a rate of 2-5° C./h until the reflux reaction is complete, thereby obtaining an adsorbent comprising the carboxylic acid dimer; and a mass ratio of the porous resin to dichloromethane to the carboxylic acid is 4:4-10:1-4;

when the porous substrate comprises charcoal materials or activated carbon materials, the method of preparing the adsorbent comprises: 1) preparing the dispersion comprising the charcoal materials or the activated carbon materials, and the carboxylic acid; and 2) transferring the dispersion in a reaction kettle, and heating the dispersion at 300° C. for 3 hours for hydrothermal reaction; and a mass ratio of the charcoal materials or the activated carbon materials to the carboxylic acid is 4:1-4;

when the porous substrate comprises chitosan materials, the method of preparing the adsorbent comprises: 1) preparing a solution comprising the chitosan materials, acetic acid solution, a porogen, and the carboxylic acid; and stirring the solution at 40-60° C. for 10-20 minutes, thereby obtaining an emulsion; and 2) using a glutaraldehyde solution as a cross-linking agent, dropwise adding the glutaraldehyde solution to the emulsion and allowing to cure for 25-30 minutes, thereby obtaining an adsorbent comprising the carboxylic acid dimer; and a mass ratio of the chitosan materials to the acetic acid solution to the porogen and to the carboxylic acid is 2:1-2:1-5:1-4; a concentration of the glutaraldehyde solution is 1%-2%; and a volume ratio of the emulsion to the glutaraldehyde solution is 100:1-2; and when the porous substrate comprises zeolite materials, the method of preparing the adsorbent comprises: 1) preparing the dispersion comprising the zeolite materials and the carboxylic acid; and 2) stirring the dispersion at 60° C. for 2-3 hours, transferring the stirred dispersion into a reflux apparatus, heating the reflux apparatus to the temperature of 90° C. at a rate of 5-15° C./h until the reflux reaction is complete, thereby obtaining an adsorbent comprising the carboxylic acid dimer; and a mass ratio of the zeolite materials to the carboxylic acid is 4:1-4.

9. The method of claim 8, wherein the method of preparing the adsorbent further comprises filtering, washing, and drying.

10. The method of claim 8, wherein the porous substrate comprises at least one adsorbent material selected from the group consisting of silica, porous resin, charcoal, chitosan, activated carbon, and zeolite.

11. A method of wastewater treatment with the adsorbent of claim 1, the method comprising:
1) adding the adsorbent to wastewater comprising heavy metal ions, wherein a pH of the wastewater is between 4.0 and 10.0;
2) when the adsorption is saturated with the heavy metal ions, removing the adsorbent from the wastewater, and regenerating the removed adsorbent in warm water at a temperature of less than 80° C.

12. The method of claim 11, wherein the adsorbent is regenerated in the warm water at 60-70° C. for 1-10 hours, and the heavy metal ions comprise $Hg^{2+}$, $Cu^{2+}$, $Ni^{2+}$, $Pb^{2+}$, $Cd^{2+}$, $Mn^{2+}$, $Fe^{3+}$, $Zn^{2+}$, $Cr^{3+}$, or a mixture thereof.

* * * * *